(No Model.) 2 Sheets—Sheet 1.
A. FINKS.
ROAD DIGGER AND GRADER.
No. 378,782. Patented Feb. 28, 1888.
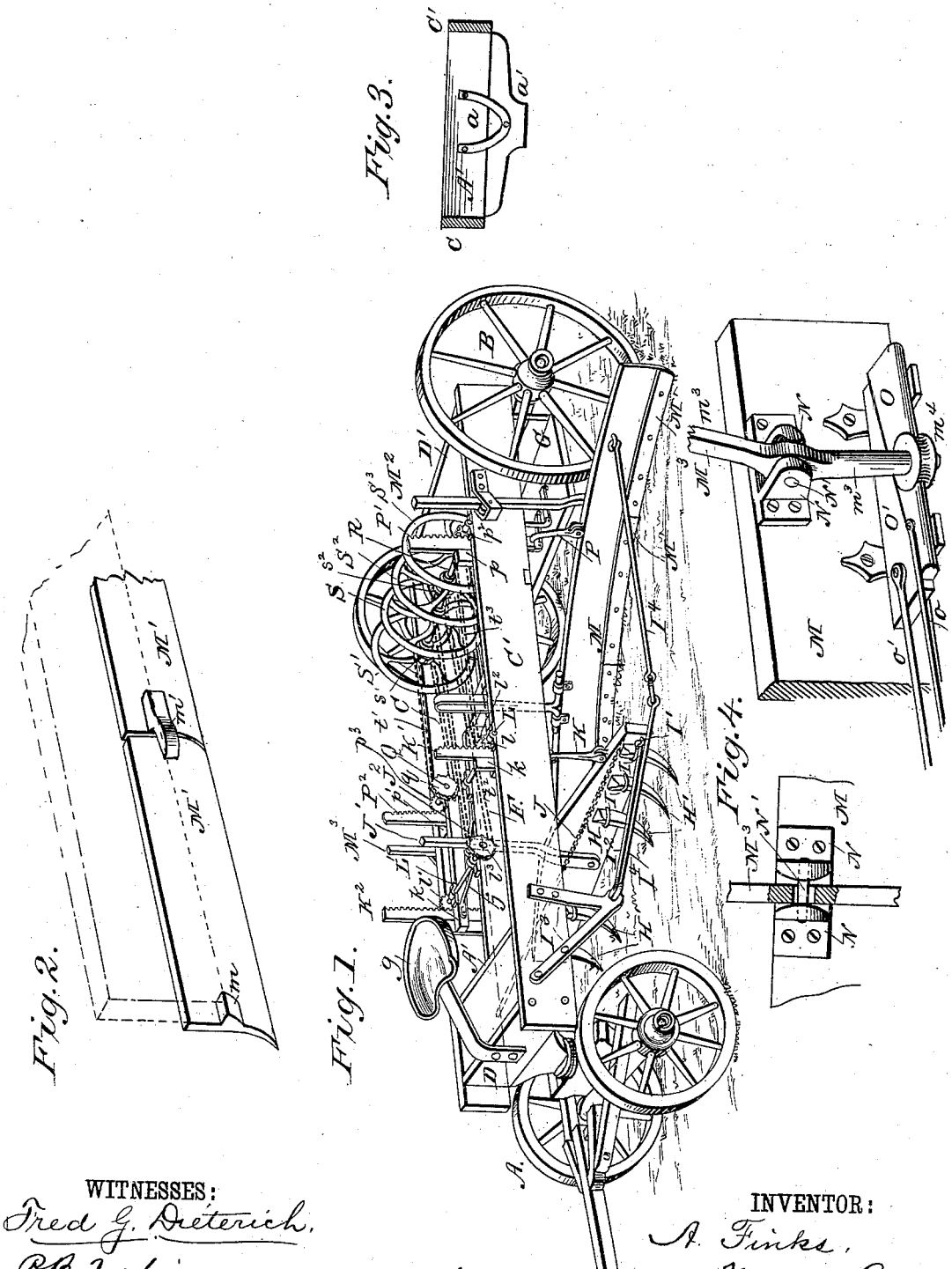
WITNESSES:
Fred G. Dieterich.
P. B. Turpin.
INVENTOR:
A. Finks,
BY Munn & Co.
ATTORNEYS.

(No Model.) 2 Sheets—Sheet 2.
A. FINKS.
ROAD DIGGER AND GRADER.
No. 378,782. Patented Feb. 28, 1888.
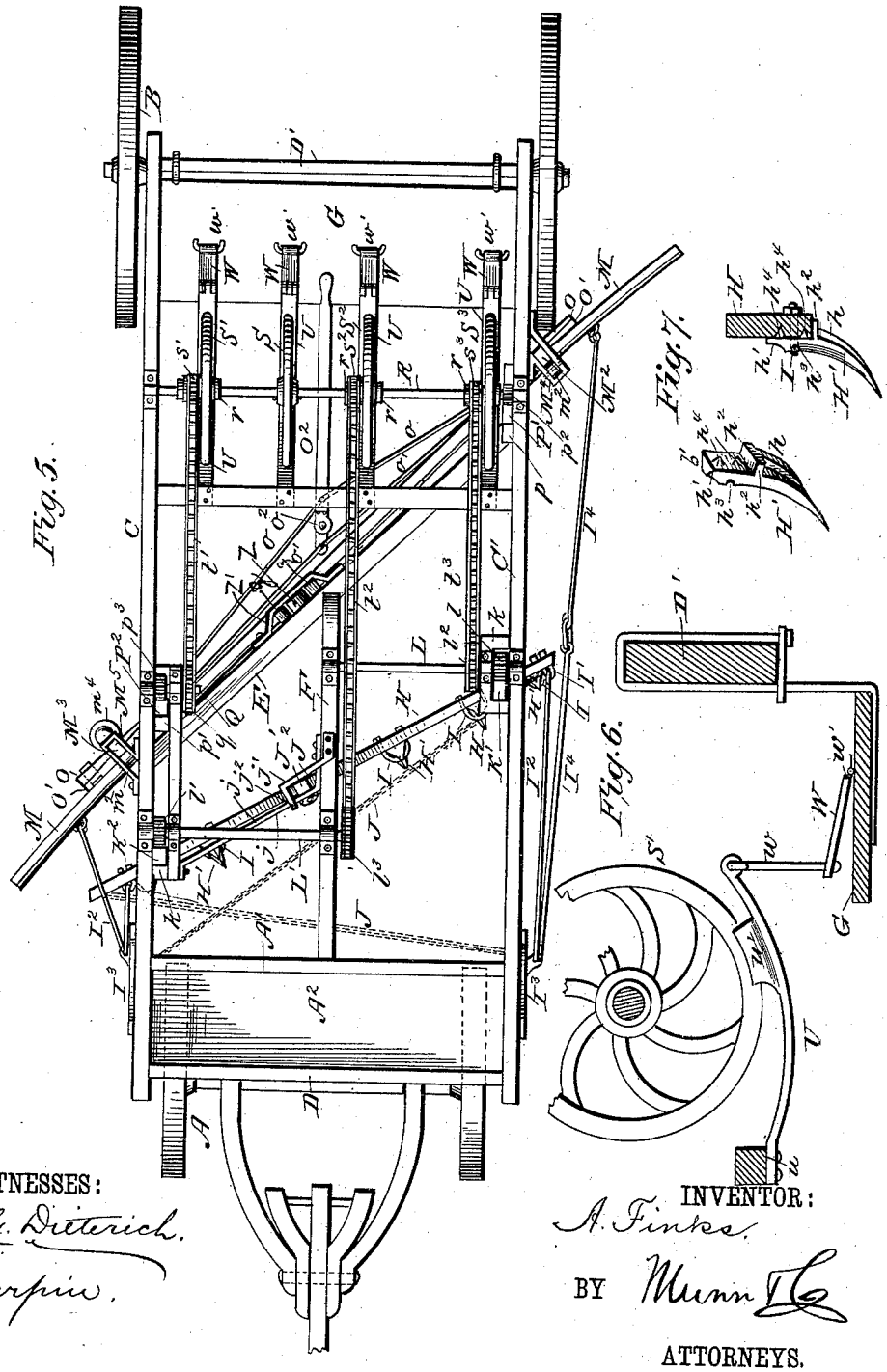
WITNESSES:
Fred G. Dieterich.
P. B. Turpin.
INVENTOR:
A. Finks
BY Munn & Co
ATTORNEYS.

UNITED STATES PATENT OFFICE.

ALBERTO FINKS, OF NEW BERLIN, NEW YORK.

ROAD DIGGER AND GRADER.

SPECIFICATION forming part of Letters Patent No. 378,782, dated February 28, 1888.

Application filed January 7, 1887. Renewed January 25, 1888. Serial No. 261,893. (No model.)

*To all whom it may concern:*

Be it known that I, ALBERTO FINKS, of New Berlin, in the county of Chenango and State of New York, have invented a new and useful Improvement in Road Diggers and Graders, of which the following is a specification.

My invention is an improvement in road diggers and graders; and it consists in certain features of construction and novel combinations of parts, as will be hereinafter described, and pointed out in the claims.

In the drawings, Figure 1 is a perspective view of my machine. Fig. 2 is a detail view of a portion of the scraper. Fig. 3 is a detail view illustrating the bolster-brace. Fig. 4 is a detail view showing the adjusting wedge-blocks. Fig. 5 is a top plan view of the machine. Fig. 6 is a detail view illustrating the brake mechanism for the operating-wheels, and Fig. 7 shows the digger-teeth.

The main frame is supported on front and rear trucks, A B, and has side beams, C C', front and rear beams, D D', a diagonal beam, E, and a beam, F, extending in the direction of the length of the frame and connecting the diagonal beam E with a cross-beam, A', which is arranged a short distance in rear of the front beam, A, and which, together with beam A and a suitable bottom, $A^2$, forms a trough or box at the front of the framing, which box may be utilized for any desired purpose. A brace, $a$, is secured to the beam A' and to the bolster $a'$, and serves to brace and give rigidity to such parts. In the rear part of the frame I support a platform, G, for the operator, and, if desired, a seat, $g$, may be suitably arranged for the driver.

The digger-bar H is formed widest at its central point and gradually decreases in width toward its ends, and by preference I provide this bar with two teeth, H', at one end, and three of such teeth at the opposite end, and said teeth being similar, the description of one will answer for all. These teeth H' are preferably made of cast-steel, curved forward toward their ends or points, and having bracing-ribs $h$ on their rear sides extending up nearly to their shanks $b'$, while on the rear sides of such teeth, near their juncture with the shanks $b'$, I form lugs $h^2$, which in practice rest under the lower edge of the digger-bar, as shown in Fig. 7. The shank $b'$ has a depression, $h^3$, in its front side, and is provided with spurs $h^4$ on its rear side. To secure said hoes I use a clip or staple, I, having its crown portion fitted over shank $h'$ and resting in depression $h^3$ thereof, while its arms are passed through the digger-bar and secured. It will be seen that the spurs $h^4$ enter the digger-bar, and, together with lugs $h^2$, co-operate with the fastening I to secure the digger-teeth firmly to their bar. The clips I, securing the end diggers, are formed double or have side loops, I', as shown, which serve for the connection with the digger-bar of the drag-connections $I^2$, the opposite or forward ends of which are secured to the lower ends of brackets $I^3$, depending from the main frame. By these brackets it will be seen that I secure a lower line of draft on the digger-bar, and am able to approximate a horizontal draft thereon, as will be understood from Fig. 1. Draft-connections $I^4$ connect these brackets with the scraper or grader bar, which bar will be more fully described hereinafter.

The digger-bar may be stayed by chains J, and to its center I secure the lower end of an upright steady-bar, J', which extends up through a keeper, $J^2$, formed of rods $j\ j'$, the rod $j$ being extended between and secured to beams C F, and forming the front and one side of keeper $J^2$, while the rod $j'$ is secured at one end to beam F, and is hooked at its opposite end, $j^2$, on rod $j$, the rod being bent to form the rear and one side of the keeper $J^2$, as will be understood from Figs. 1 and 5 of the drawings. Near its ends the digger-bar is joined by links K to rack-bars K' $K^2$, which extend upward through guides $k$, and have their teeth meshed by pinions $l\ l'$ on shafts L L', which are respectively provided with sprocket-wheels $l^2\ l^3$.

The scraper-bar M has its front side and also its under edge slightly concaved from end to end, and the scraper-sections M', secured to it, are conformed to its peculiar shape. These sections are usually formed of cast-steel, and have on their rear edges lugs $m$, adapted to fit against the under edge of the scraper-bar, and have at one end an extension, $m'$, which laps in rear of the adjacent section, as will be understood from Fig. 2. The vertical steady-post Z is secured to the scraper centrally between the ends of the latter, and extends upward through a guide, Z', supported in the frames, and within which I arrange anti-friction rollers $z$ $z$. This steady-post serves to prevent endwise motion of the scraper, as will be understood from Fig. 5.

To the scraper, near its ends, are secured uprights $M^2$ $M^3$, which project up through keepers $M^4$ $M^5$ on the framing, such keepers being provided with anti-friction rollers $m^2$, bearing in front of uprights $M^2$ $M^3$. The uprights are pivotally secured to the scraper-bar, the pivot being preferably effected in the manner shown in Fig. 4. In such construction lugs N N are secured to the scraper, and have a rod, N', extended between them, on which rod the upright is pivoted, the lugs N and the uprights $M^2$ and $M^3$ being formed to permit a limited oscillating movement of the scraper on its pivotal connections with the rod. The uprights extend at $m^3$ and $m^4$, forming bearing-extensions below their pivots, and have at their ends rollers or other bearings, $m^4$, between which and the scraper-bar I arrange longitudinally-movable wedge-blocks O O', the wedge-faces of which are in contact and which are connected by rods $o$ $o'$ with a lever, $O^2$, pivoted at $o^2$, the rods $o$ $o'$ being connected with such lever on opposite sides of its pivot $o^2$, so that the oscillation of the lever on its pivot will move such wedge-blocks in opposite directions. While it is preferred to make such blocks both movable, as thereby the greatest degree of adjustment of the scraper can be secured, it is manifest that if one block were fixed and only one movable good results could be obtained. When a roller-bearing, $m^4$, is used, such roller should be supported so that it can move slightly on its axis in the direction of length of such axis. It will be seen that I provide this wedge-block construction at both ends of the scraper, and the connection is properly made with lever $O^2$ from both sides. Now, in operation it will be seen that the scraper may be permitted to incline rearwardly or be thrown forward according as it is desired to round the road up in a greater or less degree, the curvature of the scraper and the adjusting devices coacting toward such end.

The scraper is connected by links P with rack-bars P' $P^2$, which are movable vertically in guides $p$ $p'$, and such bars are engaged by pinions $p^2$ $p^3$ on, respectively, shafts Q and R. The shaft Q has a sprocket-wheel, $q$. On the shaft R, I fix a hand-wheel, S, and I provide it (the said shaft) with bearings $r$ for hand-wheels S', $S^2$, and $S^3$, to which are secured sprocket-wheels $s'$, $s^2$, and $s^3$, connected, respectively, by belts $t'$ $t^2$ $t^3$ with sprocket-wheels $q$, $l^3$, and $l^2$ on shafts Q, L', and L. Thus it will be seen that by turning wheel S, I can turn the shaft R and through pinion $p^2$ raise the left end of the scraper, while by turning wheel S', I can raise the right end of such part through the medium of sprockets $s'$, belt $t'$, and sprocket $q$, while a movement of both such wheels will elevate the entire scraper. It will further be seen that by properly turning one or both of wheels $S^2$ or $S^3$ one or the other, or both, ends of the digger-bar can be raised or lowered, or the entire digger can be so adjusted.

To prevent the wheels S, S', $S^2$, and $S^3$ from revolving, except when so desired, I provide them with independent brakes, which also serve as detents for securing the wheels and the parts operated thereby in any desired adjustment. One of these brakes is shown in detail in Fig. 6, and consists of a stout spring-bar, U, fixed at $u$ to the framing and having a shoe, $u'$, near its free end, which shoe engages the wheel S' on the shaft R. To the free end of the spring-bar U, I connect by link $w$ the movable end of the treadle-lever W, which is pivotally supported at $w'$ on platform G. Thus it will be seen that all the wheels S, S', $S^2$, and $S^3$ will normally be locked; but when it is desired to turn one the operator by the pressure of his foot may release the brake-detent of such particular wheel while turning the same, all the digging and scraping parts of the device being thus under the control of the operator, inasmuch as the lever $O^2$ is supported on the platform and is in convenient position for manipulation by the operator standing thereon.

It will be seen that my machine is simple and strong; also, that by arranging the uprights for elevating the digger-bar at the ends of such bar outside of the teeth I secure such bar firmly at points outside of the point of digging, and am thus able to brace the digger by a single steady-post.

The rack-bars joined to the digger and scraper form elevating connections, to which are geared the shaft and operating-wheels in the manner before described.

The scraper concaved in front and under edge gives much better results than a straight scraper, covering more surface in its travel, and being just the shape desired, this form of scraper combines all the advantages of a straight scraper and of one having simply its front concaved.

Having thus described my invention, what I claim as new is—

1. The combination of the digger-bar, a digger-tooth, H', having a lug, $h^2$, and a shank, $h'$, provided with a depression, $h^3$, in its front side, and with spurs $h^4$, projected from its rear side, and the clip I, substantially as set forth.

2. In a machine, substantially as described, a scraper having its front side and under or lower edge concaved from end to end, substantially as set forth.

3. In combination with the scraper-bar, the metallic scraper-sections M', having lugs $m$ and extension $m'$, substantially as set forth.

4. The combination of the framing, the scraper-uprights $M^2$ $M^3$, pivoted to the scraper and extended below their pivotal connections therewith, and adjusting means arranged and operating between such extensions and the scraper, substantially as set forth.

5. The combination, with the scraper pivotally supported, and extensions or bearings, as $m^3$, of wedge-blocks arranged between said bearings and the scraper and movable, substantially as described, and for the purposes specified.

6. The combination of the scraper, a bearing, as $m^3$, the wedge-blocks O O', the pivoted lever, and connections between the wedge-blocks O O' and the lever, substantially as set forth.

7. The combination of the framing having guides $M^4 M^5$, having rollers $m^2$, the scraper, and the uprights $M^2 M^3$, connected with the scraper and extended up through the guides $M^4 M^5$, substantially as set forth.

8. The combination of the framing, the shafts L, L', and Q, having sprocket and pinion wheels, the digger and scraper having joined to them elevating-connections having racks meshed by the pinions of the shafts L, L', and Q, the elevating-connection P, having a rack, the shaft R, having a pinion, $p^2$, meshing rack P', and provided with a fixed hand-wheel, S, the wheels S, S', and $S^2$, journaled on the shaft R, and having sprockets and sprocket-belts connecting the sprockets of said wheels with those of the shafts, substantially as set forth.

9. The combination of the framing, the brackets $I^3$, depending therefrom, the digger and scraper suspended from the frame and drag-connections between said digger and scraper, and the brackets $I^3$, substantially as set forth.

10. The combination of the scraper pivotally supported and having its front side and lower edge concaved, as described, and means for adjusting the angle of such scraper, substantially as set forth.

11. The combination of the frame, the steady-post J', and the guide-keeper $J^2$, formed of rods $j$ and $j'$, all arranged substantially as set forth.

The above specification of my invention signed by me in the presence of two subscribing witnesses.

ALBERTO FINKS.

Witnesses:
P. B. TURPIN,
SOLON C. KEMON.